Jan. 14, 1930.  R. H. WHITELEY  1,743,645
BEARING
Filed May 14, 1928   2 Sheets-Sheet 1
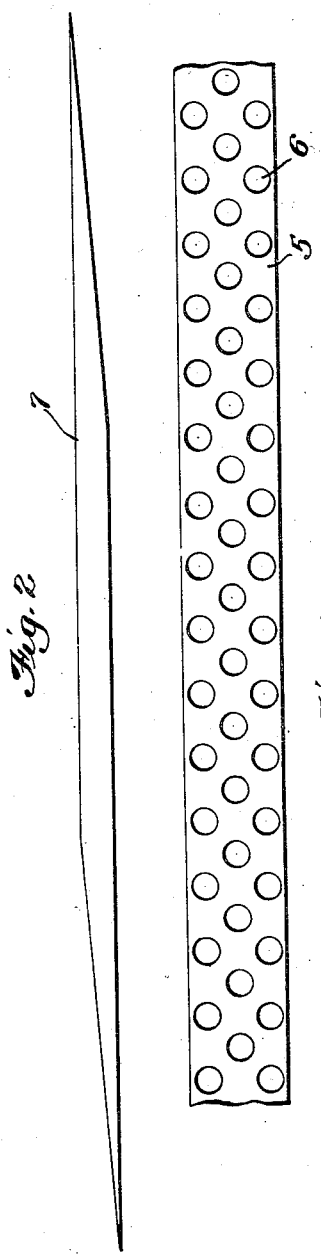
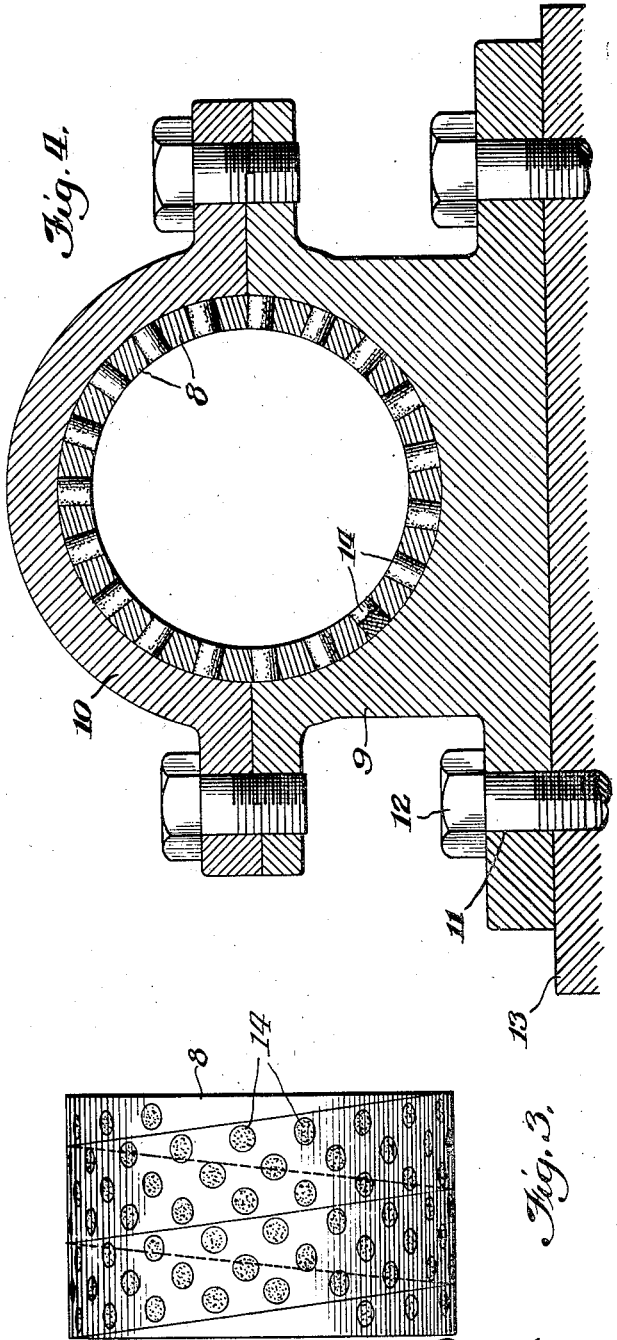
Inventor
Robert H. Whiteley
By Williams, Bradbury, McCalleb & Hinkle
Attys.

Jan. 14, 1930.  R. H. WHITELEY  1,743,645
BEARING
Filed May 14, 1928  2 Sheets-Sheet 2

Inventor
Robert H. Whiteley
By Williams Bradbury,
McCaleb & Hinkle
Attys.

Patented Jan. 14, 1930

1,743,645

UNITED STATES PATENT OFFICE

ROBERT H. WHITELEY, OF OAK PARK, ILLINOIS, ASSIGNOR TO HIMSELF AS TRUSTEE

BEARING

Application filed May 14, 1928. Serial No. 277,551.

My invention relates to bearings and more particularly to self-lubricating bearings, wherein one of the bearing members is provided with pockets or recesses for receiving lubricating material, such, for example, as the semi-solid graphite compound frequently used in such bearings.

An object of my invention is to provide a new and improved bearing.

Another object is to provide a new and improved method of making such a bearing.

Another object is to provide a bearing which can be more economically manufactured than any bearing heretofore known.

Further objects and advantages will appear as the description proceeds.

In the accompanying drawings which illustrate a preferred embodiment of my invention, and wherein similar parts are designated by like reference characters throughout the several views:

Figure 1 is a plan view of a strip of material containing lubricant holding pockets or recesses;

Figure 2 is a view on a reduced scale of a blank cut out of the strip shown in Figure 1;

Figure 3 is a side view of a cylindrical bushing formed from the blank shown in Figure 2;

Figure 4 is a view of the completed bearing;

Figure 6:
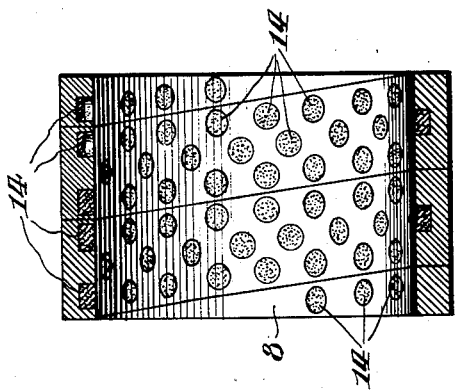
Figure 6 is a medial cross sectional view of a cylindrical bushing using the strip of Figure 6.

In carrying out my new and improved method of making a bearing, I first provide an elongated strip 5, of brass or any other suitable material, having lubricant carrying pockets or recesses 6. From this strip 5 I cut a suitable blank, such as indicated at 7 in Figure 2, and wind this blank in a spiral to form the cylindrical bushing 8 shown in Figure 3. This bushing may be carried directly by the frame of a machine or in any other suitable manner, but after the strip is inserted in the bearing it is preferably burnished into position by a burnishing bar.

In Figure 4 I have illustrated one method of mounting the bushing 8. In this figure I have shown the bushing 8 as clamped between the bracket 9 and cap 10, the bracket 9 being provided with bolt receiving openings 11 through which extend bolts 12 for securing the bracket 9 to a suitable support indicated at 13. In Figure 4 the recesses 6 are indicated as filled with lubricating material 14 which may be a graphite compound or any other suitable material.

My new and improved method of forming a bearing makes it possible to use a single strip 5 for forming bearings of various lengths and diameters by simply cutting different sized blanks 7 from this strip and winding each blank into a spiral, thereby forming the desired bearing. This method of making a bearing is much more economical than any method heretofore known and results in an improved bearing since the joint between successive coils of the spiral extends in the direction of rotation of the shaft and also lengthwise of the bearing and aids in the distribution of the lubricant over the entire bearing surface.

The lubricant containing recesses or pockets may be arranged in any desired manner and are preferably so arranged that they will afford the most even distribution of the lubricant over the bearing surfaces. In the drawings I have illustrated an arrangement wherein these pockets are formed in three rows extending lengthwise of the strip, the pockets in the center row being spaced between the pockets of the outside rows. As will be seen from Figure 3, this particular arrangement results in an excellent distribution of the pockets over the entire bearing surface after the strip has been wound into a spiral to form the cylindrical bushing.

Figure 5:
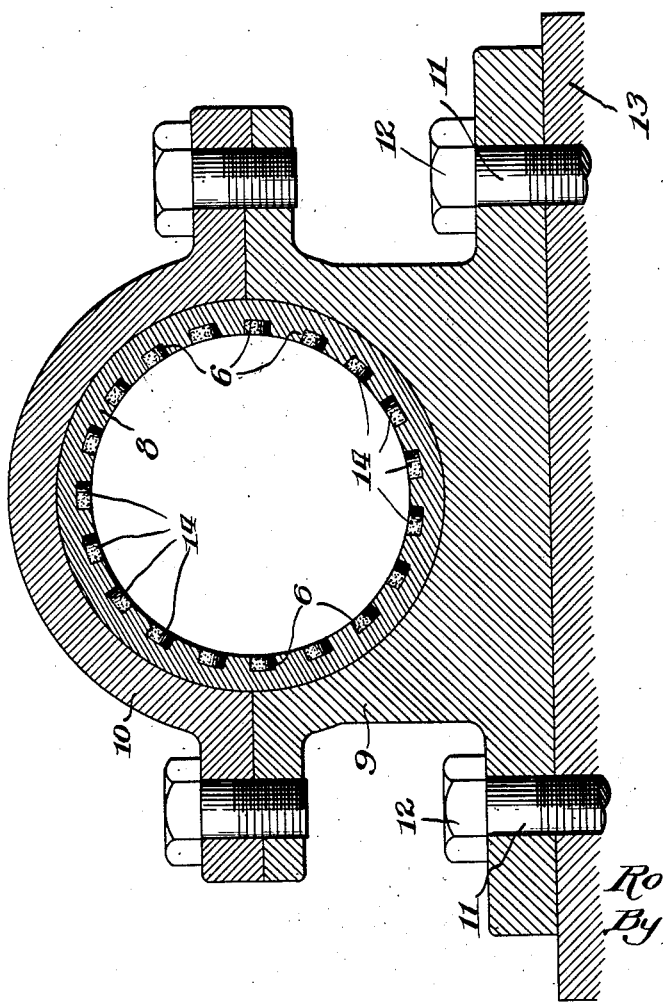
Figure 5 is a medial cross sectional elevational view of the completed bearing showing the modified form.

Referring to Figure 5, I have here illustrated a modified form of bushing in which the lubricant receiving recesses 6 only extend part way into the strip. The formation of a bushing from such a strip may be accomplished in substantially the manner previously described, the bushing being burnished into final position by a burnishing bar.

Figure 6 is a medial cross sectional view taken longitudinally of the finished bearing, and showing the recesses or pockets extending only part way into the spiral strip. When a spiral strip of the type shown is properly burnished or otherwise secured in a cylindrical cell or other shoulder, it will have considerable lubrication value even though graphite is not applied to the recesses, because the recesses themselves will serve to collect lubricant and hold the same against the shaft surface.

It will thus be observed that I have invented a novel self-lubricating bearing which may be conveniently constructed by the spiral formation of a strip of metal provided with recesses which are preferably filled with a graphite compound.

While I have illustrated and described a preferred embodiment of my invention, I do not wish to be limited to the precise details set forth, but desire to avail myself of all changes within the scope of the appended claim.

Having thus described my invention, what I claim is new and desire to secure by Letters Patent of the United States, is:

A self-lubricating bearing comprising a supporting bearing shell having a cylindrical surface and a strip of bearing metal having its ends beveled in opposite directions and having a plurality of lubricant receiving recesses formed in said metal, said strip being spirally wound to form a cylindrical member, and burnished into said supporting shell to permanently secure the same therein.

In witness whereof, I hereunto subscribe my name this 10th day of May, 1928.

ROBERT H. WHITELEY.